July 31, 1945. C. E. TACK 2,380,803
BRAKE HEAD BALANCING DEVICE
Original Filed Dec. 3, 1941
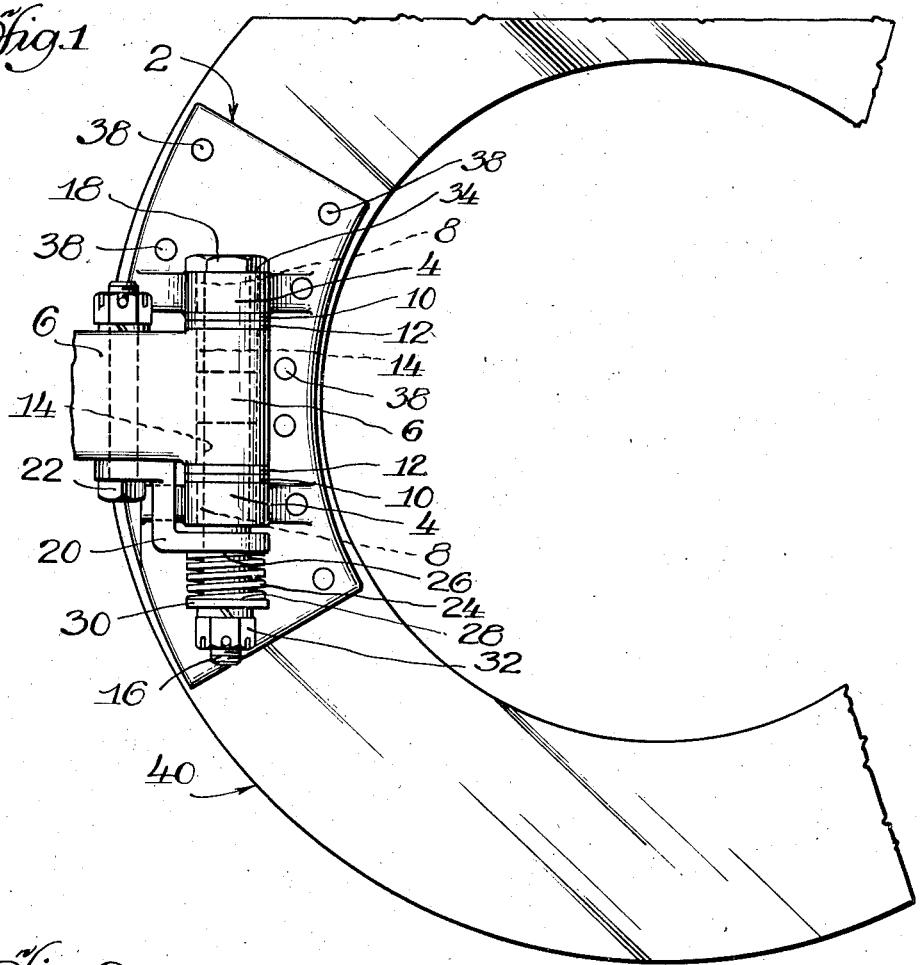
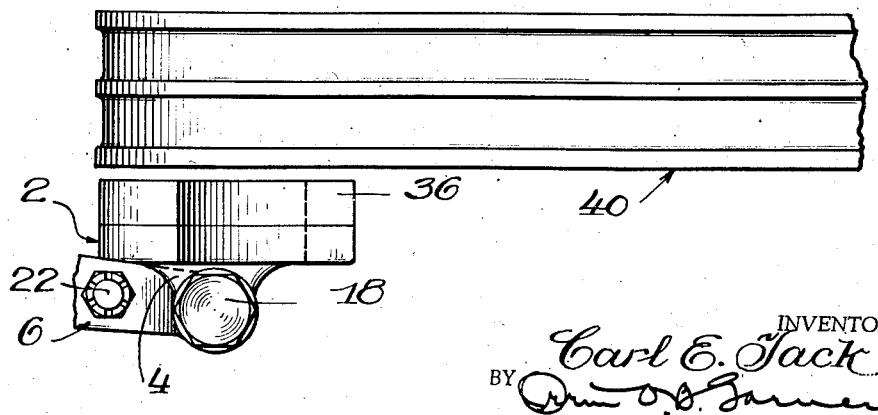
INVENTOR.
Carl E. Tack
BY
Atty.

Patented July 31, 1945

2,380,803

UNITED STATES PATENT OFFICE 2,380,803

BRAKE HEAD BALANCING DEVICE

Carl E. Tack, Chicago, Ill., assignor to American Steel Foundries, Chicago, Ill., a corporation of New Jersey Original application December 3, 1941, Serial No. 421,418, now Patent No. 2,355,120, dated August 8, 1944. Divided and this application June 25, 1942, Serial No. 448,373

15 Claims. (Cl. 188—212)

My invention relates to railway brake equipment and more particularly to mechanism for frictionally resisting the pivoting of a brake head at its point of connection to an associated brake lever, such mechanism being commonly known as a brake head balancing device. The subject matter of this invention is divided out of my copending application Serial No. 421,418, filed December 3, 1941, now Patent #2,355,120, August 8, 1944.

An object of the invention herein disclosed is to provide a brake head balancing device of practical form and suitable for convenient application to a brake head utilized in a brake arrangement for a railway car truck.

A further object of my invention is to design a balancing device suitable for utilization in an off-wheel or disc brake arrangement in which the brake shoes mounted on the brake heads are formed and arranged for engagement with opposite sides of an annular brake disc mounted on an associated wheel and axle assembly, said brake head being so connected to the associated lever as to permit the head to accommodate varying angles of application to the braking surfaces of the associated disc and at the same time to maintain said head in its normal position with respect to the associated lever when released.

My invention comprehends a brake head having spaced lugs receiving therebetween the end of a brake lever and pivotally secured thereto by means of a pin.

A specific object of my invention is the provision of a bracket on the brake lever, said bracket overlapping one of the brake head lugs and receiving an end of the pin and said bracket affording abutment for one end of a compression spring sleeved over the pin, said pin being provided with means for compressing said spring against said bracket, whereby the head of the pin is frictionally engaged with the adjacent brake head lug and said lug is urged into frictional engagement with the adjacent portion of the brake lever. It will be understood that friction developed as above described will retain the brake head in its normal position upon release of the associated brake lever while at the same time the brake head will be permitted pivotal movement with respect to said lever in order to accommodate movement of the associated brake disc during braking application of the head thereto.

Still another object of my invention is to design a bracket such as above described which may be readily applied and removed from the brake lever in order to facilitate assembly of the lever and the shoe as above described.

In the drawing, Figure 1 is a slide elevation of a brake head and brake lever embodying my invention and Figure 2 is a top plan view of the structure shown in Figure 1.

Describing my invention in detail, the brake head, generally designated 2, comprises the spaced lugs 4, 4 receiving therebetween the end of an associated brake lever 6. Each of the lugs 4, 4 is provided with an opening therethrough, said opening receiving a bushing 8 and said bushing being provided with a collar 10, said collar abutting the collar 12 on a bushing 14 positioned in the adjacent end of an opening in the brake lever 6. Extending through the opening in the lugs 4, 4 and the brake lever 6 is a pivot pin 16 affording a pivotal connection for the brake head 2 as will be clearly apparent to those skilled in the art, said pin comprising a head 18 engaged with the upper brake head lug 4 and said pin extending through a bracket 20 secured by the bolt and nut assembly 22 to the brake lever 6 and underlying the lower brake head lug 4.

A coil spring 24 is sleeved over the pin 16 in abutment as at 26 with the bracket 20 and in abutment at 28 with a washer 30, said spring being adjustably compressed between the washer and the bracket by means of a nut 32, threaded on the lower end of the pin 16. It will be apparent that when the nut 32 is tightened to compress the spring 24, the head 18 of the pin 16 will be urged into frictional engagement at 34 with the adjacent brake head lug 4 and said brake head lug will be urged downwardly toward the brake lever 6 whereby friction will be created between the collars 10 and 12 of the associated bushings. It will be further apparent that the friction thus created will resist the pivotal movement of the brake head 2 with respect to the lever 6 whereby said brake head will be retained in normal position upon said lever in released position.

A brake shoe 36 is secured at 38, 38 to the brake head and is formed and arranged for braking engagement with an annular brake disc fragmentarily indicated at 40. As will be clearly apparent from a consideration of Figure 1, the edges of the brake head 2 and the supported brake shoe 36 are arcuately formed in order that they may generally conform to the shape of the annular brake disc 40. It will be readily understood by those skilled in the art that actuating means associated with the lever 6 will cause said lever to move the brake head toward the brake disc 40 whereby the brake shoe 36 will be frictionally engaged with said disc, said head being afforded pivotal movement as above described with respect to the brake lever 6 and frictional resistance to said pivotal movement being afforded by my novel device above described.

In the modification shown the bracket 20 is supported from the lower edge of the brake lever 6, said bracket underlying and being spaced from the lower brake head lug 4. It will be understood that the bracket 20 may be, if desired, secured to the upper edge of the brake lever 6 in a position overlying the upper brake head lug 4, the balancing device being thus reversed from that shown.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device, brake head and lever members, a pair of spaced rigid means on one of said members at opposite sides of a portion of the other of said members, a bracket rigidly connected to the last-mentioned member, said bracket being spaced from the first-mentioned member and disposed adjacent one of said spaced rigid means, the clearance between said bracket and the last mentioned rigid means being substantially greater than the clearance between said portion and either of said rigid means, a pivot pin extending through both of said rigid means, said portion, and said bracket, and resilient means on one end of said pin compressed against said bracket, the opposite end of said pin having a head engaged with the other of said rigid means.

2. In a brake head balancing device, a brake head, spaced lugs thereon, a lever snugly fitted therebetween, a bracket removably secured to said lever, a pin extending through said lugs, said lever and said bracket and affording pivotal securement for said head, said bracket being spaced a substantial distance from said head and the adjacent lug, a coil spring sleeved over one end of said pin in abutment with said bracket, and means carried by said pin for compressing said coil spring against said bracket.

3. In a balancing device, a brake head member, spaced projecting means thereon, a lever member snugly fitted between said projecting means, rigid means pivotally connecting said lever member to said projecting means, spaced abutment means on said lever member and on said rigid means respectively, both of said abutment means being spaced a substantial distance from said head member and from said spaced projecting means, and resilient means compressed between said spaced abutment means, whereby said lever member is frictionally engaged with one of said spaced projecting means.

4. In a brake head balancing device, a break head with spaced lugs, a lever snugly positioned therebetween, a bracket on said lever spaced from said head and disposed adjacent to but spaced a substantial distance from one of said lugs, a pivot pin having a head abutting the other of said lugs, said pin extending through said lugs, said lever, and said bracket, and resilient means on said pin compressed against the surface of said bracket remote from the first-mentioned lug.

5. In a brake head balancing device, brake head and lever members, spaced rigid means on one of said members, rigid means on the other member snugly interposed between said spaced rigid means, a bracket on the last-mentioned member spaced from the first-mentioned member and disposed adjacent to but spaced a substantial distance from one of said spaced rigid means, a pivot pin extending through all of said rigid means and said bracket, said pin having a head abutting the other of said spaced rigid means, and resilient means carried by said pin and compressed against the surface of said bracket remote from the first-mentioned of said spaced rigid means.

6. In a brake head balancing device, brake head and support members, a pair of spaced rigid means on one of said members at opposite sides of a portion of the other of said members, a bracket rigidly connected to the last-mentioned member, said bracket being spaced from the first-mentioned member and disposed adjacent one of said spaced rigid means, the clearance between said bracket and the last-mentioned rigid means being substantially greater than the clearance between said portion and either of said rigid means, a pivot member extending through both of said rigid means, said portion and said bracket, and resilient means on one end of said pivot member compressed against said bracket, the opposite end of said pivot member having abutment means cooperating with the other of said spaced rigid means.

7. In a brake head balancing device, a brake head, spaced lugs thereon, a support member between said lugs, a pivot member extending through said lugs and said support member, and resilient means under compression on one end of said pivot member, said resilient means being formed and arranged to react against said pivot member and against a portion of the support member spaced from said head and said lugs.

8. In a brake head balancing arrangement, a brake head member, a support member, spaced lugs formed on one of said members receiving therebetween a portion of the other member, a pivot member extending through said lugs and said portion, and resilient means under compression on one end of said pivot member and formed and arranged to react thereagainst and against another portion of said other member spaced from said lugs and the member on which they are formed, said last-mentioned portion being disposed externally of the space between said lugs.

9. In a brake head balancing device, brake head and lever members, spaced rigid means on one of said members receiving therebetween a portion of the other of said members, pivot means pivotally connecting said rigid means and said portion, said portion being frictionally engaged with one of said rigid means, a bracket on said other member entirely disposed externally with respect to the space between said rigid means, and resilient means under compression and reacting against the bracket and said first-mentioned member in opposite directions substantially parallel to the axis of the pivot means whereby said portion is urged into said engagement.

10. In a brake head balancing device, a brake head comprising spaced lugs, a lever disposed between said lugs, a bracket rigidly fixed to said lever, said bracket being spaced from said head and overlapping one of said lugs, the clearance between said bracket and said lug being substantially greater than the clearance between said lever and either of said lugs, a pivot pin extending through said lever, said lugs, and said bracket, said pin affording pivotal interconnection between said lever and said head, and resilient means carried by said pin and compressed against the surface of said bracket remote from the adjacent lug.

11. In a brake head balancing device, a brake head comprising spaced top and bottom lugs, a lever disposed between said lugs, a bracket rigidly fixed to said lever, said bracket being spaced from said head and overlapping but spaced from one of said lugs, the clearance between said bracket and said lug being substantially greater than the clearance between said lever and either of said lugs, a pivot pin having a head abutting the other of said lugs, said pin extending through said lever, both of said lugs, and said bracket, and resilient means carried by said pin and compressed against the surface of said bracket remote from the first-mentioned lug.

12. In a brake head balancing arrangement, a brake head, spaced lugs thereon, a lever snugly fitted between said lugs, a pin extending through said lugs and said lever, and resilient means under compression on one end of the pin and formed and arranged to react thereagainst and against a portion of the lever spaced from said head and said lugs.

13. In a brake head balancing arrangement, a brake head, spaced lugs thereon, a lever snugly interposed between said lugs, a pin extending through said lugs and said lever, and resilient means under compression, carried by one end of the pin, and adapted to react axially thereagainst and against a portion of the lever spaced a substantial distance from said head and said lugs.

14. In a brake head balancing device, a brake head having spaced lugs, a support member extending between said lugs, pivot means extending through said lugs and said member, said member having a portion spaced from said head and disposed at one side of said lugs and said pivot means, resilient means under compression, and means for transmitting reaction of said resilient means axially of said pivot means to said head and to said portion, whereby said support member is frictionally engaged with one of said lugs.

15. In a brake head balancing device, a brake head member, a support member, spaced rigid means on one of said members, rigid means on the other member disposed between said spaced rigid means, pivot means extending through all of said rigid means, resilient means under compression, and means for transmitting reaction of said resilient means to respective members, said transmitting means including a bracket on said other member disposed externally of the space between said spaced rigid means.

CARL E. TACK.